Patented Feb. 4, 1936

2,029,881

UNITED STATES PATENT OFFICE

2,029,881

METHOD FOR PRODUCING TITANIUM DIOXIDE

William T. Little, Westfield, N. J., assignor, by mesne assignments, to American Zirconium Corporation, Baltimore, Md., a corporation of Maryland No Drawing. Application April 23, 1934, Serial No. 721,970

13 Claims. (Cl. 23—202)

This invention relates to the manufacture of titanium dioxide, and has particular reference to a method of hydrolyzing solutions of titanium compounds which are normally difficult to hydrolyze, to obtain good yields of titanium precipitates, by adding to the solution an alkali metal salt of titanic acid.

The manufacture of titanium dioxide for use as a pigment has generally been effected by attacking by various methods a titanium bearing mineral such as ilmenite (largely iron titanate) or rutile (largely titanium dioxide) to render the titanium soluble, then preparing a solution of titanium salt, from which the titanium is precipitated as a hydroxide; and calcining to the oxide form.

In the very early stages of the art, the titanium was precipitated by alkali; this method gives very poor quality titanium dioxide pigment. The next method used was precipitation of the hydroxide by hydrolysis of very dilute solutions—containing about 3-5% or less of titanium dioxide. This method gives better pigment material, but is slow and uneconomical, because of the large volumes of solution needed. The Fladmark Patent 1,288,863 of Dec. 24, 1918, marked the next step in the art—precipitation by boiling, in air, or at high temperatures and pressures in an autoclave, of fairly concentrated solutions of titanium dioxide (80-250 grams per liter), regulating the content of sulfuric acid so that the titanium was present not as the normal salt—Ti(SO$_4$)$_2$—but as a salt having a sulfate content between Ti(SO$_4$)$_2$ and TiO(SO$_4$.) In the parlance of the art, the constitution of the solution is expressed as factor of acidity (F. A.), the TiO SO$_4$ having FA=0, the Ti(SO$_4$)$_2$ having FA=100, intermediate figures representing varying percentages of acid combined with the titanium oxide). The high concentrations used permit the recovery of the acid from the hydrolysis solution.

The concentrated, low acid solutions yield good pigment titanium dioxide; but the hydrolysis requires very prolonged heating to insure good yields, or heating for shorter periods at such high temperatures as to require autoclave pressures.

In order to hasten the precipitation at atmospheric conditions, various methods have been devised. Blumenfeld (Reissues 17,429 and 17,430, Sept. 10, 1929, and Re. 18,854, May 10, 1933) suggests a slow admixture of water with the solution, or (U. S. P. 1,851,487 of Mar. 29, 1932) the use of a colloidal solution of titanium dioxide prepared by the same method: Mecklenburg (Reissue 18,790—Apr. 4, 1933) proposes to precipitate titanium hydrate by the use of a caustic alkali and heat the mixture to obtain a seed suspension. Rhodes (U. S. P. 1,922,328—Aug. 15, 1933) makes a seed suspension by treating an alkali titanate with hydrochloric acid, obtaining a suspension of titanium dioxide in an alkali chloride solution. Richter (U. S. P. 1,947,226—Feb. 13, 1934) uses a very low F. A. sulfate solution, prepared from titanium dioxide obtained by leaching an alkali titanate.

The exact mechanism of the hydrolysis is not known; some workers in the art believe it to be due to the presence or formation of colloidal titanium oxide particles which coagulate to form a precipitate.

I have discovered that the hydrolysis of titanium salt solutions may be hastened and brought to early substantial completion by the use of a dry alkali metal titanate, without the necessity of preparing special seed suspensions, or treating the solutions to be hydrolyzed in any particular manner.

The dry alkali titanate may be prepared in any convenient manner. As a starting point, I may use ilmenite, rutile, or a titanium oxide obtained by any desired process, in the dry state. The mixture may be fused with a caustic alkali, such as caustic soda or caustic potash, or it may be merely fritted therewith, in the manner described in the Richter Patent 1,932,087, of Oct. 24, 1933.

A typical titanate may be made, as these outlined, by heating 100 pounds of ground rutile with 100 pounds of caustic soda, in the form of a 75% solution. The mixture is kneaded and heated, adding 25 pounds of dry soda ash. When the thick paste reaches 300° C., it is transferred to a calcining furnace, and calcined at 600-650° C. for about 30 minutes, to yield a fine granular powder. This powder is largely an alkali metal salt of titanic acid, of uncertain constitution. It may be used to accelerate hydrolysis in the form in which it comes from the calciner, or it may preferably be further powdered.

The titanium solution to which it is to be added may be any one of those which are relatively difficult to hydrolyze completely in a short time at atmospheric pressure. The solution may be obtained by attacking ilmenite or rutile with sulfuric acid, in a manner well known to the art; the mass is leached to give a titanium sulphate solution, which will contain ferrous sulphate if ilmenite has been attacked. The ferrous sulphate is preferably crystallized out, after reduction of all the iron to the ferrous state; and the resultant solution is adjusted to desired concentration and acidity. Either dilute or concentrated solutions may be employed, and the factor of acidity may be varied over a wide range; in general, we prefer to use as a matter of economy relatively high titanium oxide concentrations (200–250 grams per liter) at F. A.=60 to 90. The solutions may, however, be normal salt solutions with F. A.=100 or slightly higher.

The solid alkali titanate is added to the solution, using enough alkali titanate to equal about 5–20% of the weight of titanium dioxide in the solution, and the solution is heated to boiling. The alkali titanate to a large extent dissolves in the solution, and a precipitate of titanium dioxide begins to form; the hydrolysis continues to substantial completion on reasonable length of boiling at atmospheric pressures, with or without a reflux condenser. About 5–6 hours is necessary; an autoclave may be used, in which case the time of action is shorter.

In a specific example of my invention, I prepared a titanium sulphate solution containing 262 grams of titanium oxide and 510 grams of sulphuric acid free and combined with $TiO_2$ per liter. 400 cc. of this solution was heated with refluxing for five hours; at the end of this time, 33% of the titanium content of the solution had been precipitated. A similar sample of 400 cc. of solution was heated under similar conditions, with the addition of 10 grams (9.6%) of $TiO_2$ content) of dry powdered alkali titanate containing about 50% $TiO_2$; after five hours, 73% of the titanium content had been precipitated.

After precipitation, the hydrated oxide is filtered from the acid solution, which is concentrated for further use. The oxide is carefully washed, and calcined at 800–1000° C.; this drives off the water of hydration, and the sulfuric acid which would not wash out. The calcined pigment is wet ground to improve its pigment properties, and dried.

The exact mechanism of the action of the dry titanate is unknown to me; it differs from the mechanism of the agents previously employed in that earlier investigators used either a titanium oxide suspension, or an actual titanium salt solution.

The constitution of the dry titanate may vary somewhat as to ratio of alkali oxide to titanium oxide, the term alkali titanate being a general term to cover the reaction product of an alkali and titanium oxide. As stated above, any alkali metal may be used, sodium and potassium being preferred because of cost.

The solutions to be hydrolyzed, as indicated above, may vary considerably both as to titanium dioxide and sulfuric acid content.

The hydrolysis may be effected by simple boiling in the open, or with a reflux condensor; heating to higher temperatures in an autoclave will, of course, accelerate the hydrolysis, in a manner analogous to such acceleration where no addition agent is used.

The term titanium dioxide, as used in the claims, has reference to the hydrated oxide of somewhat variable composition which results from the hydrolysis.

Having described my invention, I claim:

1. In a process for preparing titanium dioxide, the step which comprises hydrolyzing a titanium salt solution by heating in the presence of a solid alkali titanate.

2. In a process for preparing titanium dioxide, the steps which comprise adding a solid alkali titanate to a titanium salt solution, and heating the solution to a temperature sufficient to effect hydrolysis.

3. In a process for preparing titanium dioxide, the steps which comprise adding a solid alkali titanate to a titanium salt solution, and boiling the solution to a temperature sufficient to effect hydrolysis.

4. In a process for preparing titanium dioxide, the steps which comprise adding a solid alkali titanate to a titanium salt solution, and heating the solution to a temperature sufficient to boiling at atmospheric pressures to effect hydrolysis.

5. In a process for preparing titanium dioxide, the steps which comprise adding a solid alkali titanate to a titanium salt solution, and heating the solution to a temperature sufficient to boiling for 5–6 hours to effect hydrolysis.

6. In a process for preparing titanium dioxide, the steps which comprise adding a solid alkali titanate to a titanium sulphate solution, and heating the solution to a temperature sufficient to effect hydrolysis.

7. In a process for preparing titanium dioxide, the steps which comprise adding a solid alkali titanate to a concentrated titanium sulphate solution, and heating the solution to a temperature sufficient to effect hydrolysis.

8. In a process for preparing titanium dioxide, the steps which comprise adding a solid alkali titanate to a titanium sulphate solution, with a factor of acidity between 60–90, and heating the solution to a temperature sufficient to effect hydrolysis.

9. In a process for preparing titanium dioxide, the steps which comprise adding a solid alkali titanate to a titanium sulphate solution in which the titanium is present as the normal sulphate, and heating the solution to a temperature sufficient to effect hydrolysis.

10. In a process for preparing titanium dioxide, the steps which comprise adding a solid alkali titanate to a titanium sulphate solution containing about 200 grams titanium dioxide per liter of solution, and heating the solution to a temperature sufficient to effect hydrolysis.

11. The method of hydrolyzing titanium salt solutions which comprises adding thereto a dry alkali titanate, and heating the solution to a temperature sufficient to effect hydrolysis and precipitation to titanium oxide.

12. The method hydrolyzing titanium sulphate solutions which comprises adding thereto a dry alkali titanate, and heating the solution to a temperature sufficient to effect hydrolysis and precipitation to titanium oxide.

13. The method of hydrolyzing concentrated titanium sulphate solutions which comprises adding thereto a dry alkali titanate, and heating the solution to a temperature sufficient to effect hydrolysis and precipitation to titanium oxide.

WILLIAM T. LITTLE.